US008782609B2

(12) United States Patent
Robinson

(10) Patent No.: US 8,782,609 B2
(45) Date of Patent: Jul. 15, 2014

(54) TEST FAILURE BUCKETING

(75) Inventor: Michael Paul Robinson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 229 days.

(21) Appl. No.: 13/241,216

(22) Filed: Sep. 23, 2011

(65) Prior Publication Data

US 2013/0081000 A1   Mar. 28, 2013

(51) Int. Cl.
G06F 9/44 (2006.01)

(52) U.S. Cl.
USPC .......................................................... 717/127

(58) Field of Classification Search
CPC ... G06F 11/366; G06F 11/3692; G06F 11/3466
USPC .......................................................... 717/127
See application file for complete search history.

(56) References Cited

U.S. PATENT DOCUMENTS

| | | | |
|---|---|---|---|
| 6,622,264 B1 | 9/2003 | Bliley et al. | |
| 6,862,696 B1 * | 3/2005 | Voas et al. | 717/126 |
| 7,246,039 B2 | 7/2007 | Moorhouse | |
| 7,266,808 B2 * | 9/2007 | Kolawa et al. | 717/126 |
| 7,509,538 B2 | 3/2009 | Triou et al. | |
| 7,529,974 B2 * | 5/2009 | Thibaux et al. | 714/26 |
| 7,610,514 B2 * | 10/2009 | Modani et al. | 717/128 |
| 7,613,949 B1 | 11/2009 | Boone et al. | |
| 7,890,814 B2 | 2/2011 | Zhang et al. | |
| 7,979,848 B2 * | 7/2011 | Hinchey et al. | 717/127 |
| 8,316,353 B2 * | 11/2012 | Aoyama et al. | 717/124 |
| 8,336,033 B2 * | 12/2012 | Schmelter et al. | 717/127 |
| 8,566,792 B2 * | 10/2013 | Chasman et al. | 717/124 |
| 2005/0086643 A1 * | 4/2005 | Shane | 717/124 |
| 2005/0257086 A1 * | 11/2005 | Triou et al. | 714/25 |
| 2005/0289404 A1 * | 12/2005 | Maguire | 714/57 |
| 2006/0195745 A1 * | 8/2006 | Keromytis et al. | 714/741 |
| 2006/0253837 A1 * | 11/2006 | Hudson et al. | 717/124 |
| 2007/0006037 A1 * | 1/2007 | Sargusingh et al. | 714/38 |
| 2008/0250284 A1 | 10/2008 | Guo et al. | |
| 2012/0144374 A1 * | 6/2012 | Gallagher et al. | 717/128 |

OTHER PUBLICATIONS

Travison et al., "Test Instrumentation and Pattern Matching for Automatic Failure Identification", 2008, Microsoft Corporation.*
Kim et al. "Crash Graphs: An Aggregated View of Multiple Crashes to Improve Crash Triage", 2011, IEEE.*

(Continued)

*Primary Examiner* — Wei Zhen
*Assistant Examiner* — Junchun Wu
(74) *Attorney, Agent, or Firm* — Steve Crocker; Jim Ross; Micky Minhas

(57) ABSTRACT

Failure messages generated as a result of tests performed on a target application are bucketed in an effort to correlate related failure messages with minimal or no human interaction. An exemplary method for bucketing failure messages includes receiving a failure message, searching a stack trace of a target application for a blame stack trace frame from which the failure message originated, finding a most similar match bucket from a plurality of buckets, determining if the most similar match bucket at least meets a similarity threshold, adding the failure message to the most similar match bucket, if it is determined that the most similar match bucket at least meets the similarity threshold, and creating a new bucket and adding the failure message to the new bucket, if it is determined that the most similar match bucket does not at least meet the similarity threshold.

17 Claims, 7 Drawing Sheets

(56) References Cited

OTHER PUBLICATIONS

Teknomo et al. "Frame-Based Tracing of Multiple Objects", 2001, IEEE.*

Salfner et al. "Predicting Failures of Computer Systems: A Case Study for a Telecommunication System", 2006, IEEE.*

Debroy, et al., "Insights on Fault Interference for Programs with Multiple Bugs", Retrieved at <<http://ieeexplore.ieee.org/stamp/stamp.jsp?tp=&arnumber=5362110>>, 20th International Symposium on Software Reliability Engineering, Nov. 16-19, 2009, pp. 165-174.

Travison, et al., "Test Instrumentation and Pattern Matching for Automatic Failure Identification", Retrieved at <<http://ieeexplore.ieee.org/stamp/stamp.jsp?tp=&arnumber=4539565>>, 2008 International Conference on Software Testing, Verification, and Validation, Apr. 9-11, 2008, pp. 377-386.

* cited by examiner

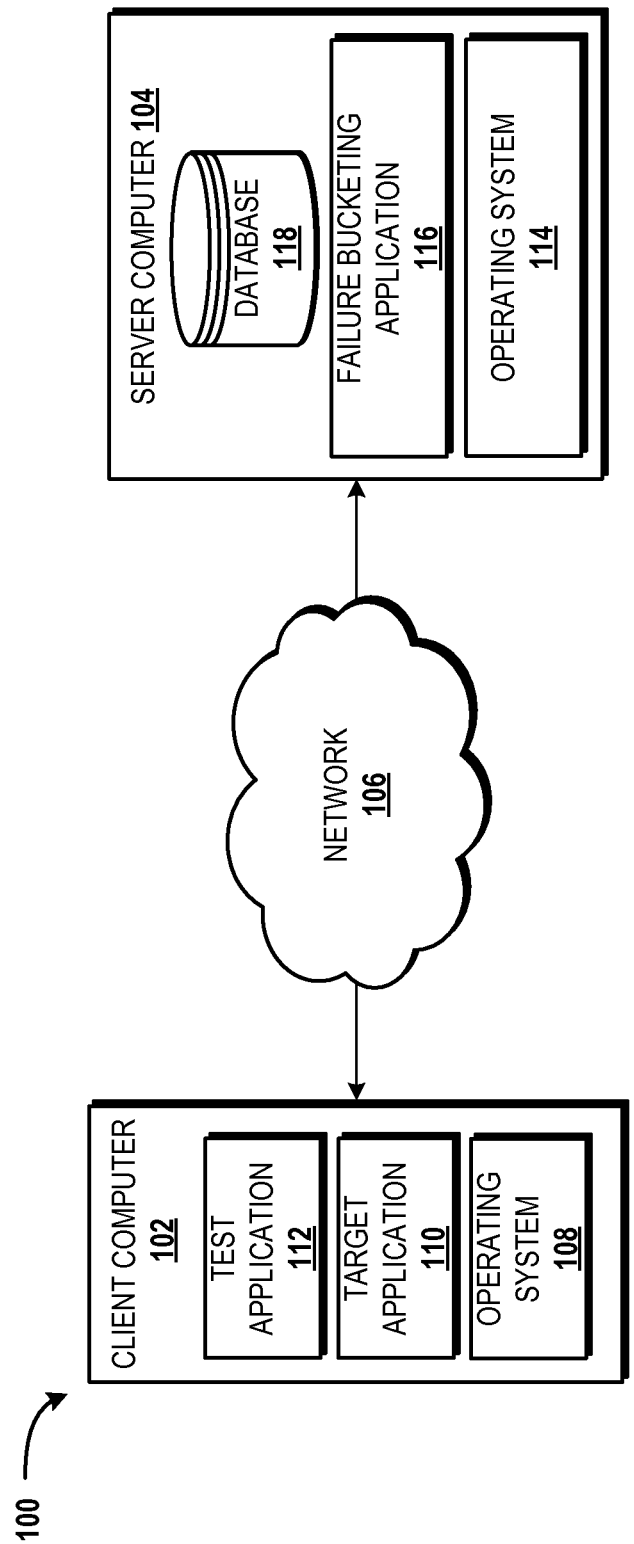

TEST FAILURE BUCKETING

BACKGROUND

Extensive testing is vital to the successful development of software applications. If a software application is not properly tested, the end user may experience software bugs that hinder efficiency, cause potentially fatal data loss, or generally render the software application frustrating to use, among other problems. As a result, software developers allocate substantial human and monetary resources to software testing in an effort to ensure that the end user experience mirrors that intended by the software developer.

For some software applications, it is common for thousands or even millions of tests to be conducted on a periodic basis (e.g., weekly) to verify that the software application functions properly at various stages of development. Due to the number of tests that must be performed, these tests are often automated and managed by an automated test system. Reporting failures that result from automated tests is one function of an automated test system. In some implementations, when a test fails, an automated test system stores a result that then needs to be further investigated by a human tester. As software applications become increasingly complex, more tests are typically needed to validate the application, and those tests are run more often. This increases the number of automation failures that may occur and, as a result, the volume of automation being run generates more results than human tester resources can effectively investigate. This results in a number of potential issues that are identified, but nobody is available to perform any further investigation. These potential issues may be inadvertently included in a version of the software application that reaches end users.

As the volume of automated tests increases, it becomes increasingly more difficult for testers to keep up with the volume of data produced. In response to this, "failure tagging" was created. Failure tagging allows testers to specify a pattern occurring in specific tests which represent identical problems. If a pattern reoccurs, a tester does not need to re-investigate that failure. Failure Tagging depends on testers to generate accurate information about the failure for it to function well, so when testers create a poor "tag", the system may flag unrelated failures as a recurrence of a tagged failure.

Managing a large set of failure tags is time intensive. That is, as testers have more results to investigate, they have less time available to manage failure tags, which, in turn, increases the chances of a poor tag being created because users are rushing through the investigation process. Failure tags are also not resilient to changes in test logging and do not properly function for automation executed for multiple languages. Even with failure tagging, the failure investigation rate can be under 50%.

Software applications have been developed that identify a crash in a software application and uniquely identify that crash. Information related to the crash is then placed into a "bucket". If the same crash occurs again, the information from that crash is added to the same bucket. This functionality is based off of what happens in an end-user application, not an application in development and undergoing testing. Additionally, this functionality identifies buckets based off of information, such as the version of the software application. This does not change frequently for software applications that have been released to the end user. However, for software applications that are under development, the version can change on a daily or even hourly basis, thus generating many buckets for a single problem.

It is with respect to these and other considerations that the disclosure made herein is presented.

SUMMARY

Concepts and technologies are described herein for test failure bucketing. In accordance with the concepts and technologies disclosed herein, a computer system identifies related test automation failures and places them into appropriate buckets, without requiring the kind of human interaction needed by failure tagging in order to do so.

According to one aspect, a computer-implemented method for bucketing failure messages generated as a result of a test performed on a target application includes receiving a failure message that is associated with a failure, searching a stack trace of the test application for a blame stack trace frame from which the failure message originated, finding a most similar match bucket from a plurality of buckets, determining if the most similar match bucket at least meets a similarity threshold, adding the failure message to the most similar match bucket if it is determined that the most similar match bucket at least meets the similarity threshold, and creating a new bucket and adding the failure message to the new bucket if it is determined that the most similar match bucket does not at least meet the similarity threshold.

According to another aspect, a computer-implemented method for managing failure messages includes receiving a failure message, logging the failure message, pre-processing failure data associated with the failure message, bucketing the failure message and the failure data into a bucket, and performing failure tagging for the failure message. The method further includes determining if the failure message matches a failure tag identified via the failure tagging. If it is determined that the message matches a failure tag, the method further includes applying a failure tag to the failure message and instructing a reporting client computer to perform operation based upon the applied failure tag. If, however, it is determined that the message does not match a failure tag, the method further includes instructing a reporting client computer to perform operations based upon the bucket to which the failure message was applied.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 is a system diagram illustrating an exemplary operating environment for the various embodiments disclosed herein.

DETAILED DESCRIPTION

Figure 2A:
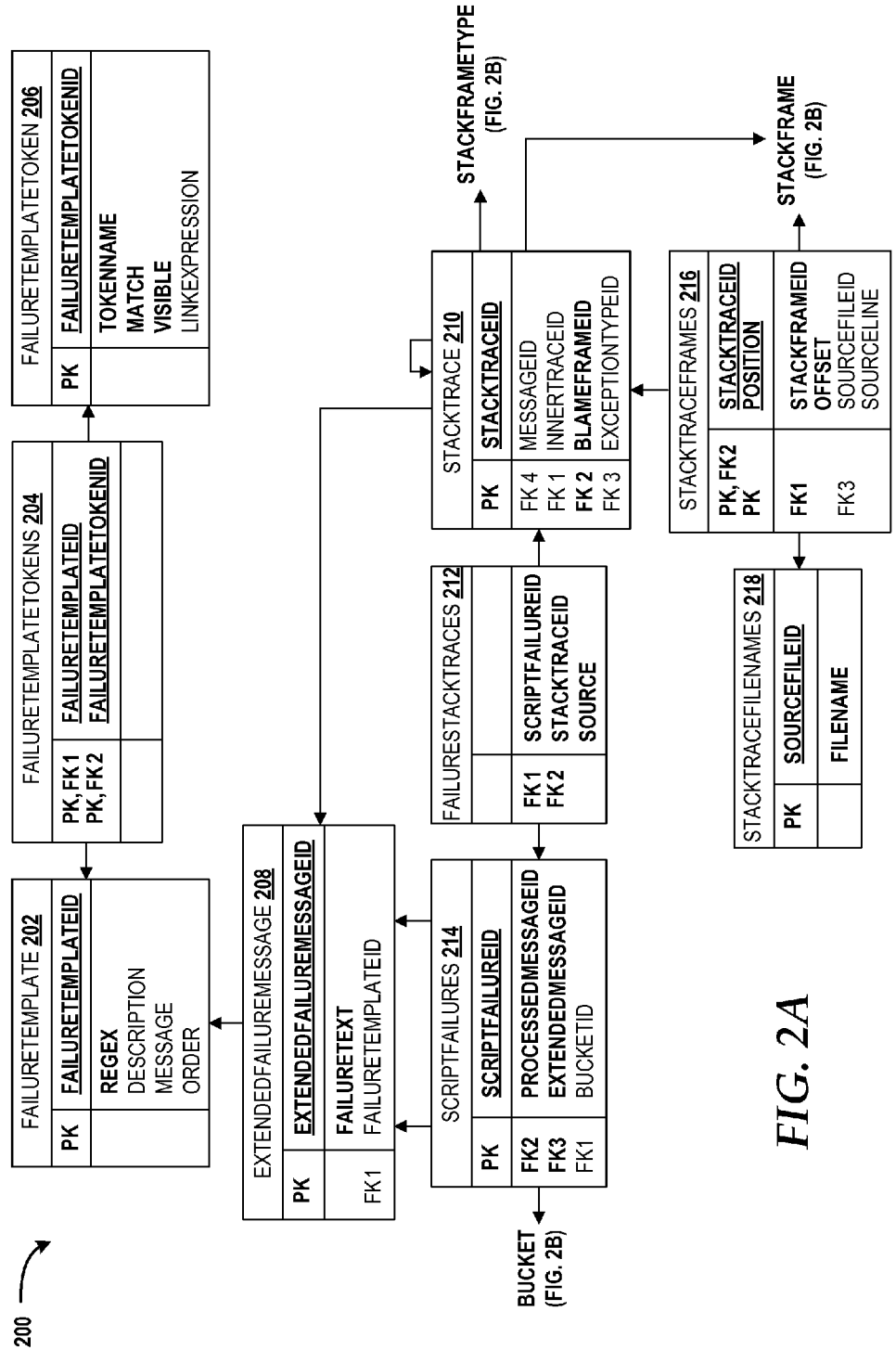
FIGS. 2A and 2B are diagrams illustrating a database table structure, according to an exemplary embodiment.

The following detailed description is directed to concepts and technologies for test failure bucketing. According to the concepts and technologies described herein, a computer system identifies related test automation failures and places them into appropriate buckets, without requiring the kind of human interaction needed by failure tagging in order to do so.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for test failure bucketing will be presented.

Referring now to FIG. 1, aspects of one operating environment 100 for the various embodiments presented herein will be described. As shown in FIG. 1, the operating environment 100 includes a client computer 102 and a server computer 104 that are in communication via a network 106. It should be appreciated that the configuration illustrated in FIG. 1 is merely illustrative and that additional computing systems and networks not shown in FIG. 1 may be utilized in various embodiments presented herein. For example, although a single client computer 102 and server computer 104 are shown, multiple client computers 102 or server computers 104 are contemplated. Thus, the illustrated embodiments should be understood as being exemplary, and should not be construed as being limiting in any way.

The client computer 102 is configured to execute an operating system 108 and one or more software applications such as, for example, a target application 110 and a test application 112. The operating system 108 is a computer program for controlling the operation of the client computer 102. The software applications are executable programs configured to execute on top of the operating system 108 to provide various functionality described herein.

The target application 110 is a software application that is currently undergoing tests performed by the test application 112. The target application 110 may be any software application for which a software developer desires to perform one or more tests. The target application 110 may be any version of a software application including, for example, an initial version, various alpha or beta versions, final (e.g., "shipping") versions, or post-final versions. Although the target application 110 is shown as being executed by the client computer 102, the target application 110 may alternatively be executed by the server computer 104 or another computer system. For example, the target application 110 may execute on a stand-alone computer system that is not configured in a client/server relationship.

The test application 112 is a software application configured to execute one or more operations to carry out one or more tests on the target application 110. In some embodiments, a test is associated with one or more types of software testing including, but not limited to, black box testing, white box testing, unit testing, incremental integration testing, integration testing, functional testing, system testing, end-to-end testing, sanity testing, regression testing, acceptance testing, load testing, stress testing, performance testing, usability testing, install/uninstall testing, recovery testing, security testing, compatibility testing, alpha testing, beta testing, any combination thereof, and the like. Those skilled in the art will appreciate the applicability of various types of tests, such as those described above, to a given target application and/or based upon specific functionality of the given target application for which a developer desires to test. The specific type of tests executed by the test application 112 is dependent at least partially upon the needs of a software developer in the development of a specific target application. Monetary, time, and human resource availability may affect the applicability of various tests. The above test types should be understood as being exemplary, and should not be construed as being limiting in any way.

The test application 112 is further configured to specify one or more failure conditions for each test. If a failure condition is at least met during a test, the test application 112 generates a failure message indicating that the failure condition has been at least met. It is contemplated that the failure conditions may be pre-defined or may be definable by a user, such as a programmer or other individual associated with the development of the target application 110. Moreover, the test application 112 may be an off-the-shelf or readily-available test application, or may be a proprietary test application developed by or for the developer of the target application 110.

In some embodiments, the target application 110 is loaded into or otherwise utilized by the test application 112 to conduct one or more tests. For example, source code associated with the target application 110 may be loaded into the test application 112, wherein the test application 112 builds the target application 110 from the source code and performs one or more tests before, after, and/or during the build.

In some embodiments, the target application 110 includes the test application 112. For example, one or more code modules of the target application 110 may include code directed to one or more tests. Execution of one or more of these code modules results in conducting the one or more tests that are associated therewith.

The server computer 104 is configured to execute an operating system 114 and one or more software applications such as, for example, a failure bucketing application 116. The operating system 114 is a computer program for controlling the operation of the server computer 104. The software applications are executable programs configured to execute on top of the operating system 114 to provide various functionality described herein.

The failure bucketing application 116 is configured to perform analysis of test failure messages identified by the test application 112 in order to correlate related failure messages with minimal or no human interaction, and to assign the correlated failure messages to one or more buckets. The process of assigning failure messages to a bucket is referred to herein as "bucketing". "Adding" and "assigning" failure messages to a bucket are used interchangeably herein.

According to one aspect, the failure bucketing application 116 is configured to identify an approximate location in code of the target application 110 responsible for generating failure messages, using this to subdivide the failure messages into one or more set of failures.

According to another aspect, the failure bucketing application 116 is configured to analyze and differentiate between similar and disparate failure messages. In particular, the failure bucketing application 116 is configured to compare two failure messages and derive a metric identifying how "similar" are the two failure messages, and to distinguish between differences in failure messages that are considered important and those considered unimportant. The criteria based upon which a failure message is considered important or unimportant, in some embodiments, is defined by a developer of the target application 110.

Although the failure bucketing application 116 is shown as being executed by the server computer 104, the failure bucketing application 116 may alternatively be executed by the client computer 102 or another computer system. For example, the failure bucketing application 116 may execute on a stand-alone computer system that is not configured in a client/server relationship or some other distributed configuration. Operations performed upon execution of the failure bucketing application 116 by the server computer 104 or another computer system are described herein below with reference to FIGS. 3-5.

The server computer 104 also includes a database 118. The database 118 is configured to store information generated and/or utilized by the failure bucketing application 116 in accordance with various aspects disclosed herein. In some embodiments, the database 118 is implemented as a relational database including a collection of relations or tables. A diagram illustrating an exemplary relational database table structure is illustrated and described herein with reference to FIGS. 2A and 2B.

According to various embodiments, the client computer 102 and/or the server computer 104 are personal computers ("PC") such as desktop, tablet, or laptop computer systems. The client computer 102 and/or the server computer 104 may include other types of computing systems including, but not limited to, server computers, handheld computers, netbook computers, tablet computers, embedded computer systems, personal digital assistants, mobile telephones, smart phones, or other computing devices.

Figure 2B:
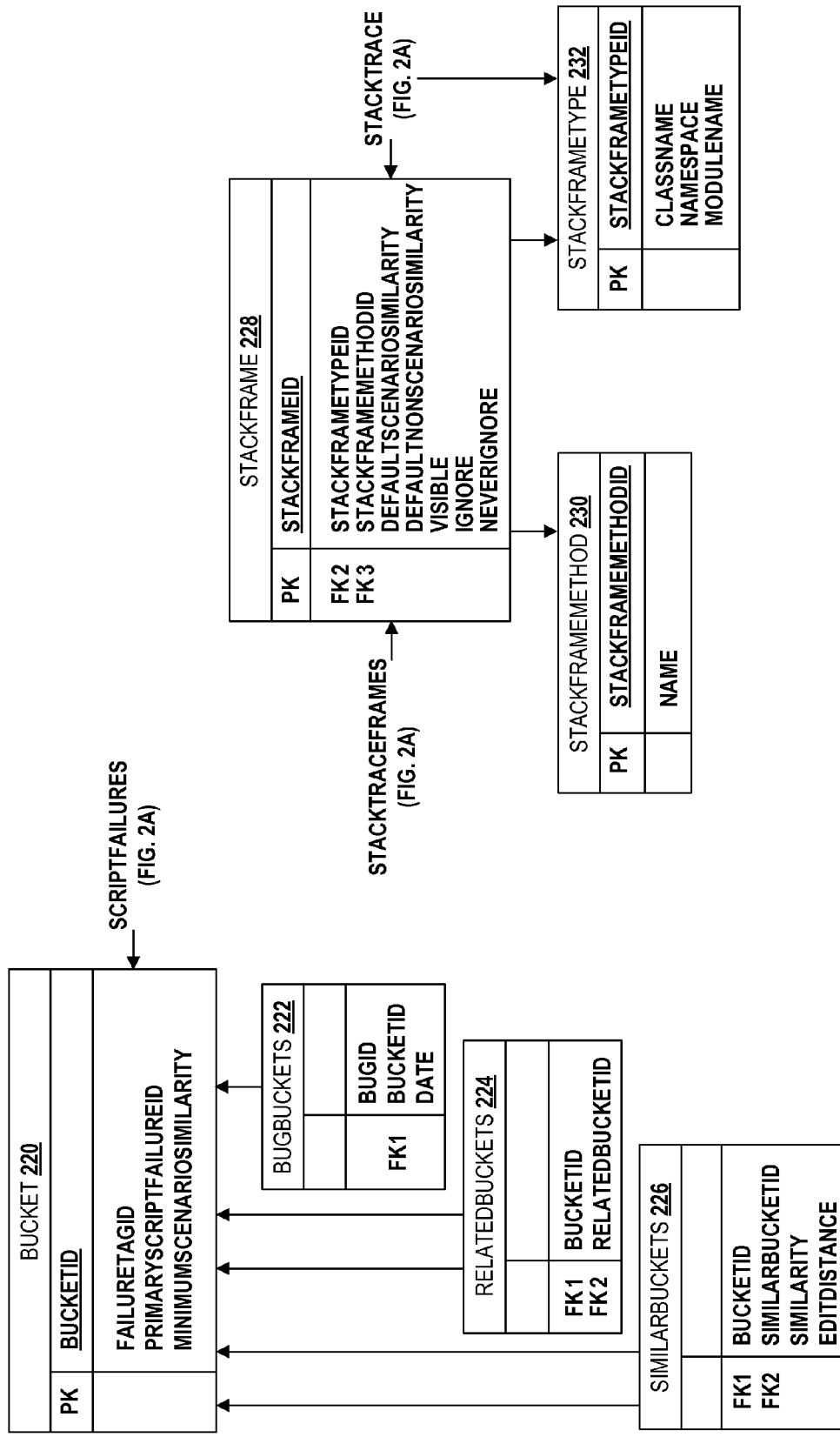

Turning now to FIGS. 2A and 2B, a diagram illustrating an exemplary database table structure 200 including various tables 202-232 will be described. Each of the various tables 202-232 includes one or more fields. The fields include special fields called primary key ("PK") fields and foreign key ("FK") fields. The PK fields uniquely identify a table within the database 118. The FK fields provide reference to fields in another table within the database table structure 200. The illustrated database table structure 200 is provided to illustrate exemplary data and to demonstrate how the database 118 may, in some embodiments, store this data. Accordingly, the database table structure 200 should be understood as being exemplary, and should not be construed as being limiting in any way.

Referring particularly to FIG. 2A, a FailureTemplate table 202, a FailureTemplateTokens table 204, a FailureTemplateToken table 206, an ExtendedFailureMessage table 208, a StackTrace table 210, a FailureStackTraces table 212, a ScriptFailures table 214, a StackTraceFrames table 216, and a StackTraceFileNames table 218 are illustrated. The StackTrace table 210, the ScriptFailures table 214, and the StackTraceFrames 216 each reference tables described below in the description of FIG. 2B. The tables 202-218 will now be described.

The FailureTemplate table 202 stores data that is used to match a failure template to a received failure message. A failure template is a regular expression with named groups that are to be checked in a certain order.

Failure templates are used herein to check failure messages against a known pattern before analyzing similarity, as described in greater detail below. If a pattern is found, strings are considered a match if the parameter names and value are the same. That is, message is either 100% similar or 0% similar. This allows different messages with the same data to be recognized as being associated with the same failure. This also allows for compensation for changes to log message over time (e.g., as development progresses through various application versions; incremental changes) with no net impact to users. Moreover, this is useful in cases where the failure message is localized (e.g., different text for French, English, Japanese, or some other language).

The FailureTemplateTokens table 204 links a failure template with the named groups used in a given template's regular expression. The FailureTemplateTokens table 204 refer ences the FailureTemplateToken table 206. Each row in the FailureTemplateToken table 206 represents a named group used in a given template's regular expression. Different expressions may use the same named groups, thereby allowing different formatting to result in identical matches. It should be understood that all named groups in a template need not match. Sometimes one or more parameters in a failure message are used to generate a UI element to indicate that a failure has taken place. Even though an element is matched, it does not need to be shown in the UI. There are cases in which these tokens can be used to construct some text or a link for the UI element.

The ExtendedFailureMessage table 208 stores at least a portion of a failure message (e.g., the first 20 kilobytes ("KB") of a Unicode failure message). The text does not need to be searched or indexed. Unicode failure messages and longer failure messages may be stored separately and may be synced. The ExtendedFailureMessage table 208 also stores a reference to the template that matches the failure message. In the illustrated embodiment, this reference is FK 1 for FailureTemplateID. By placing this reference in the ExtendedFailureMessage table 208, the cost of finding a template match only occurs when a new, distinct failure message is received.

The StackTrace table 210 describes a distinct stack trace or an exception. If an exception is to be stored, a MessageID originates. A blame frame is also referred to more particularly herein as a blame stack trace frame. An exemplary StackTrace table 210 is shown below.

| StackTraceID | Message | InnerTraceID | BlameFrame | ExceptionTypeID |
|---|---|---|---|---|
| 1000 | 6000 | NULL | 3000 | 2000 |

The FailureStackTraces table 212 links stack traces with a failure. The FailureStackTraces table 212 also indicates the origin of the stack trace. When a failure has multiple stack traces, the origin is used to determine which stack trace should be analyzed for bucketing purposes.

The illustrated ScriptFailures table 214 includes a ScriptFailureID, a BucketID, a ProcessedMessageID, and an ExtendedMessageID. In some embodiments, the ScriptFailureID table 214 is modified to include columns to refer to an original failure message and a processed failure message. The processed failure message represents the output of any pre-processing that may have been performed on the failure message, such as pseudo-translation. The ProcessMessageID and the ExtendedFailureMessageID refers to the processed message and the failure message, respectively. The BucketID refers to the bucket associated with the failure message.

The StackTraceFrames table 216 stores the collection of stack frames associated with a given stack trace, as well as each frame's position within the stack trace. The StackTraceFrames table 216 also stores other data that is expected to change frequently and is not needed for bucketing purposes, but may be useful in rendering the stack trace in a UI. An exemplary StackTraceFrames table 216 is shown below.

| StackTraceID | Position | StackFrameID | Offset | SourceFileID | SourceLine |
|---|---|---|---|---|---|
| 1000 | 1 | 3000 | 163 | 5000 | 2644 |
| 1000 | 2 | 3001 | 93 | 5001 | 524 |
| 1000 | 3 | 3002 | 1235 | NULL | −1 |
| 1000 | 4 | 3003 | 529 | 5002 | 2492 |
| 1000 | 5 | 3004 | 770 | 5002 | 1084 |
| 1000 | 6 | 3005 | 998 | 5003 | 814 |
| 1000 | 7 | 3006 | 97 | 5003 | 553 |
| 1000 | 8 | 3007 | 0 | 5003 | 393 |
| 1000 | 9 | 3008 | 73 | 5004 | 647 |
| 1000 | 10 | 3009 | 89 | 5004 | 333 |
| 1000 | 11 | 3010 | 555 | 5005 | 156 | includes the exception text, and the ExceptionTypeID refers to the actual type of the exception received. If an exception is not to be stored, the values for the MessageID and the ExceptionTypeID are NULL. If an exception is to be stored and the exception includes an inner exception, the InnerTraceID is to be set to a StackTrace for the inner exception; otherwise, the InnerTraceID is to be set to NULL. The BlameFrameID is to be set to the StackFrame that represents the blame frame for this stack trace. Storing this information here prevents having to recalculate a blame frame every time the bucketing mechanism examines a stack trace. A blame frame is a stack trace frame of a given stack trace from which a failure message The StackTraceFilenames table 218 is a normalized table of relative filenames referenced in stack traces. In some embodiments, absolute filenames are not stored in this table. The depot root path is to be stripped from the stored path (e.g., "d:\application\branch\project\foo\bar.txt" may be stored as "project\foo\bar.txt"). The maximum size of this table may be bound to the number of files in a particular enlistment. The "depot" in this context refers to the version control management system. The depot root path is the base path in which source filed are stored. An exemplary StackTraceFilenames table 218 is shown below.

| SourceFileID | Filename |
|---|---|
| 5000 | sts\stsom\core\spfields.cs |
| 5001 | sts\stsom\core\spviewfields.cs |
| 5002 | sts\stsom\core\spfeature.cs |
| 5003 | sts\stsom\core\spfeaturecollection.cs |
| 5004 | duettasklib\tasklibrary\server\reporting\reportingtasklib.cs |
| 5005 | duettest\test\server\tangoreporting\tangoreportingacceptancetests.cs |

Referring now to FIG. 2B, a Bucket table 220, a BugBuckets table 222, a RelatedBuckets table 224, a SimilarBuckets table 226, a StackFrame table 228, a StackFrameMethod table 230, and a StackFrameType table 232. The Bucket table 220, the StackFrame table 228, and the StackTraceType table 232 each reference tables described above in the description of FIG. 2A. The tables 220-2232 will now be described.

The Bucket table 220 stores a collection of related failures. Each bucket has an associated FailureTagID, which facilitates operations such as holding machines or collecting additional failure data. The Bucket table 220 also stores a reference to a result that was responsible for the creation of the bucket. This is the reference result used with which to compare incoming results, in order to determine if an incoming result belongs in this bucket. Moreover, the Bucket table 220 specifies matching criteria for incoming failures. These values may be fine-tuned on a bucket-by-bucket basis if desired.

The BugBuckets table 222 links bugs found during testing with buckets, and specifies when that link was created. The date allows the bugs to be listed in the order they were associated, allowing a UI to show the most recent bug first.

The RelatedBuckets table 224 links a bucket to one or more related buckets. Data in this table may be primarily user-driven. In some embodiments, a UI may allow users to link buckets together, thereby causing the contents of all related buckets to visually merge in the UI.

The SimilarBuckets table 226 caches the result of edit distance and similarity calculations when the bucket is created. The entries into this table may grow exponentially over time. In some embodiments, the functionality of the SimilarBuckets table 226 is removed to reduce computation costs related to maintenance thereof.

An edit distance measures the number of edits used to make one string look like another string. These edits may be, for example, insertions, deletions, swaps, combinations thereof, or the like. Strings with small edit distances are more likely to be related than ones with large edit distances. Strings with small edit distances tend to be similar in length. Edit distance may be utilized to find variations of strings containing parameters, such as machine names, time of day, expected versus actual, random numbers, and the like. In some embodiments, an algorithm for calculating edit distance is word-based instead of character-based, replaces non-alpha-numeric characters with whitespace, and ignores the position and order of words. In some embodiments, insertions are equated to the difference in number of words. In some embodiments, substitutions are equated to the difference between the number of words of the smallest string and the number of words shared between strings. In some embodiments, the edit distance equals the sum of the number of insertions and the number of substitutions.

Edit distance calculations are an absolute measure and are not useful except for ranking a list of strings. Message similarity converts edit distances to a relative measure. In some embodiments, similarity=1−(editDistance/wordCount). Using this equation, a string with 1 difference out of 4 words is 75% similar, where the editDistance=1 and the wordCount=4. Likewise, a string with 10 differences out of 200 words is 95% similar, where the editDistance=10 and the wordCount=200. Thus, an edit distance of 1 in a string with 4 words is not as good of a match as an edit distance of 10 in a string of 200 words. Message similarity provides an effective way to specify matching criteria when comparing strings.

In some embodiments, a threshold similarity is defined within the failure bucketing application 116 to consider strings as being equal if the strings are greater than a certain percentage similar. For example, a threshold similarity may be defined to indicate that strings are to be considered equal if the strings are greater than or equal to 80% similar. In some embodiments, this threshold may vary between buckets, or may change if the failure matches certain additional criteria.

The StackFrame table 228 represents a distinct stack frame off of which the bucketing algorithm described herein below pivots. The StackFrame table 228 may store the class and method names, matching properties, any default properties for new buckets, and UI rendering settings. The StackFrame table 228 does not store frame parameters upon which bucketing does not depend, such as offset or file information. Since the bucketing algorithm pivots off of the StackFrame table 228, storing frame parameters in the StackFrame table 228 would result in many additional duplicate buckets being generated. It is beneficial to avoid multiple rows in the StackFrame table 228 with the same TypeID and MethodID. An exemplary StackFrame table 228 is shown below.

| StackFrameID | TypeID | MethodID | DefaultSimilarity | Visible | MatchFlags |
|---|---|---|---|---|---|
| 3000 | 2001 | 4000 | 80 | True | 0 |
| 3001 | 2002 | 4001 | 80 | True | 0 |
| 3002 | 2003 | 4002 | 80 | True | 0 |
| 3003 | 2004 | 4003 | 80 | True | 0 |
| 3004 | 2004 | 4004 | 80 | True | 0 |
| 3005 | 2005 | 4005 | 80 | True | 0 |
| 3006 | 2005 | 4006 | 80 | True | 0 |
| 3007 | 2005 | 4001 | 80 | True | 0 |
| 3008 | 2006 | 4007 | 80 | True | 0 |
| 3009 | 2006 | 4008 | 80 | True | 0 |
| 3010 | 2007 | 4009 | 80 | True | 0 |

The StackFrameMethod table 230 is a normalized table of the method names used in a stack frame. The maximum size of this table may be bound to the number of unique method names in the source code of the target application 110. An exemplary StackFrameMethod table 230 is shown below.

| MethodID | Name |
| --- | --- |
| 4000 | GetField |
| 4001 | Add |
| 4002 | FeatureActivated |
| 4003 | DoActivationCallout |
| 4004 | Activate |
| 4005 | AddInternal |
| 4006 | AddInternalWithName |
| 4007 | TurnOnFeatureOnWeb |
| 4008 | ActivateReportRouting |
| 4009 | Setup |

The StackFrameType table 232 represents a unique type. It is possible to normalize the namespace and module names if necessary. The maximum size of this table may be bound to the number of unique types in the source code of the target application 110. An exemplary StackFrameType table 232 is shown below.

| TypeID | ClassName | Namespace | ModuleName |
| --- | --- | --- | --- |
| 2000 | ArgumentException | System | mscorlib.dll |
| 2001 | SPFieldCollection | Microsoft.SharePoint | Microsoft.SharePoint.dll |
| 2002 | SPViewFieldCollection | Microsoft.SharePoint | Microsoft.SharePoint.dll |
| 2003 | ReportRouterFeatureReceiver | Microsoft.Office.Tango.Server.Reporting | Microsoft.Office.Tango.Server.Reporting.dll |
| 2004 | SPFeature | Microsoft.SharePoint | Microsoft.SharePoint.dll |
| 2005 | SPFeatureCollection | Microsoft.SharePoint | Microsoft.SharePoint.dll |
| 2006 | ReportingTaskLib | MS.Internal.Motif.Office.Duet.TaskLibrary.Server | MS.Internal.Motif.Office.Duet.TaskLibrary.Server.dll |
| 2007 | TangoReportingAcceptanceTests | MS.Internal.Test.Automation.Motif.Office.Tests | ms.internal.motif.office.tests.tangoreporting.dll |

Data in the tables 202-232 may collectively have or may each have a storage lifetime. Rows in the Bucket table 220 may exist as long as the PrimaryScriptFailureID exists. Rows in the BugBuckets table 222, the RelatedBuckets table 224, and the SimilarBuckets table 226 may exist as long as the RelatedBucketID exists. Rows in the ExtendedFailureMessage table 208 may exist as long as the rows are referenced by a ScriptFailureID. Rows in the FailureTemplate table 202, the FailureTemplateTokens table 204, the FailureTemplateToken 206, the StackTraceFilenames table 218, the StackFrame table 228, the StackFrameMethod table 230, and the StackFrameType table 232 may exist indefinitely. Rows in the FailureStackTraces table 212 may exist as long as the StackTraceID is referenced by a row in the FailureStackTraces table 212.

In some embodiments, in an effort to make bucketing function more effectively, some data may be modified or pre-populated in the database 118. Results of failures existing prior to implementation of the bucketing methods disclosed herein may be treated as legacy results since these results existed prior to all of the data necessary to correctly bucket existing failures was stored in the database 118. As such, pre-existing failures may not be properly bucketed, so special treatment is not given to these failures. Also, if a change is made that for some reason invalidates one or more existing buckets, a similar operation may be performed to mark old results as unusable.

In some instances, it is not possible to correctly bucket the result of a test using the failure data collected during the test, or using the bucketing method described herein. This may occur when a test is killed because the client computer 102 crashed, a user kills the test, or for some other reason that prevented the test from executing to completion. To accommodate the aforementioned instances, a special set of buckets may be created to explicitly associate with results. These special buckets may be created to include only results which were explicitly added. In other words, normal results would not be bucketed into a special bucket. These special buckets may be identified using a NULL PrimaryResultID. As there is no result with which to compare, the bucketing method will not identify special buckets as targets for a result.

The bucketing method attempts to divide failures into sets based upon a blame frame, with the goal of dividing failures into groups that are likely to be related. In some cases, data may not be available with a failure, such as when a Process-Monitor failure is logged, when the data collection process fails, or when a stack trace does not contain a blame-able frame. When these cases occur, fictional data that represents these cases may be assigned to the StackTrace table 210 in the database 118. This simplifies the bucketing algorithm and allows for the sub-division of the set of "could not get data" failures into smaller sets. A special "no trace" trace may be used to indicate that no stack trace was available for a failure. A special "OnFailure timeout" trace may be used to indicate that a timeout occurred during one or more operations performed during execution of an OnFailure process that is initiated in response to receipt of a failure message. A special "no blame frame" trace may be used to indicate that a stack trace has no blamable frames.

In addition to or as an alternative to the above data, the database 118 may be pre-populated with failure template data. The failure template data may include, but is not limited to, asserts that are generated by the target application 110, other asserts not generated by the target application 110, failures that are encountered by other applications used in testing, bucketing, failures encountered during execution of operations by the client computer 102, and failures encountered during execution of operations by the server computer 104.

Figure 3:
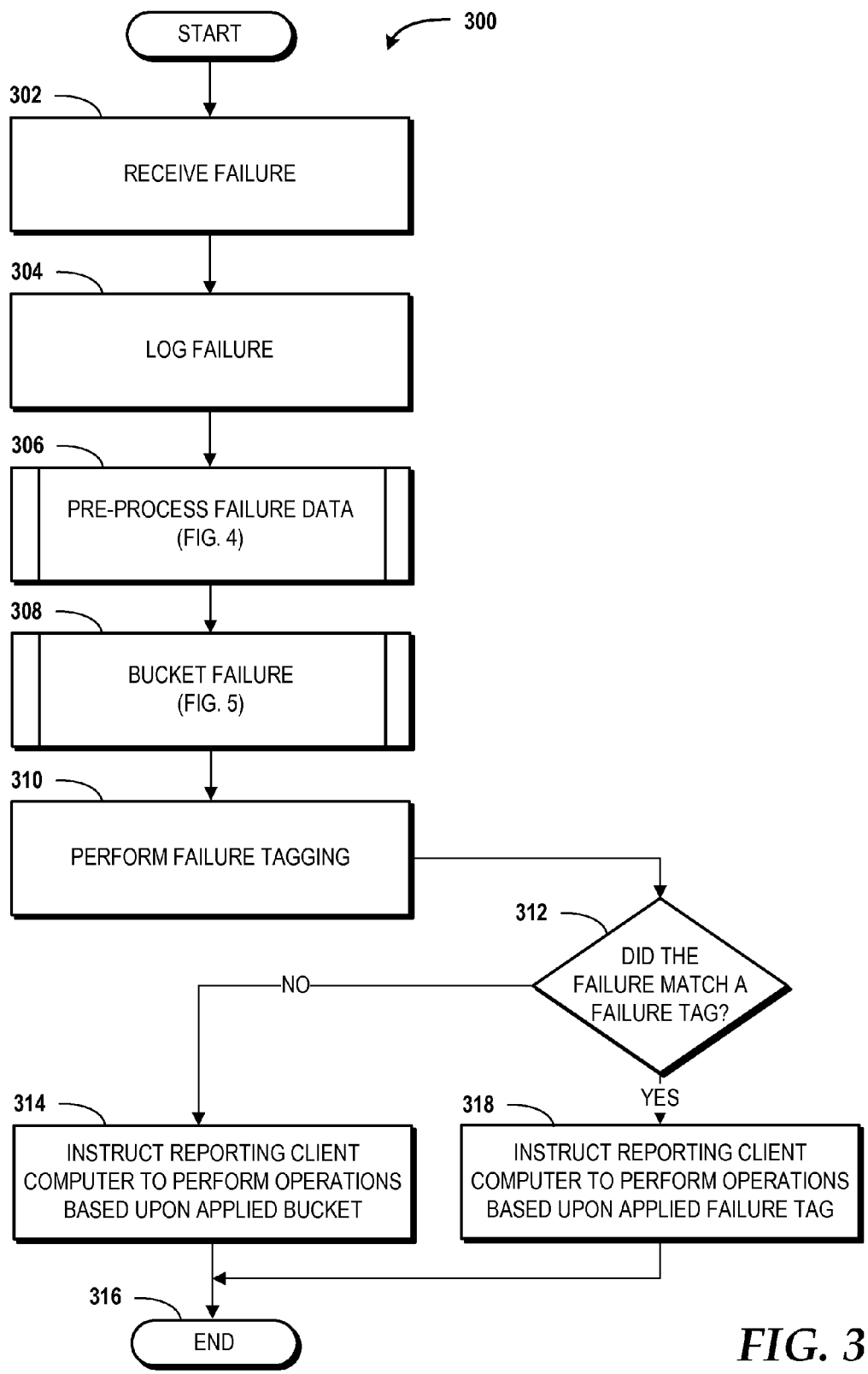
FIG. 3 is a flow diagram showing aspects of a method for managing failures, according to an exemplary embodiment.

Turning now to FIG. 3, aspects of a method 300 for managing failures will be described. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The method 300 begins at operation 302, wherein a failure message is received. From operation 302, the method 300 proceeds to operation 304, wherein the failure message is logged. Logging a failure message includes writing the failure message to disk. In some embodiments, the failure message contains extensible markup language ("XML") code defining a unique and random identification for the failure. Various methods of the failure bucketing application 116 may be executed on logging a failure message. These methods are referred to herein as "OnFailure" methods.

After a failure message is logged, at operation 304, a service is called on the server computer 104. For purposes of explanation and not limitation, the service is a web service provided by the failure bucketing application 116 executing on the server computer 104. Local services are also contemplated in accordance with the various embodiments disclosed above that do not rely upon a client/server model or some other distributed computing model.

From operation 304, the method 300 proceeds to subprocess 306, wherein failure data associated with the logged failure message is pre-processed. The subprocess 306 is illustrated and described herein below with reference to FIG. 4.

From subprocess 306, the method 300 proceeds to subprocess 308, wherein the failure is bucketed. The subprocess 308 is described herein below with reference to FIG. 5.

From subprocess 308, the method 300 proceeds to operation 310, wherein traditional failure tagging is performed for the failure. The method 300 then proceeds to operation 312, wherein it is determined if the failure matches a failure tag. If the failure does not match a failure tag, the method 300 proceeds to operation 314, wherein the client computer that reported the failure (e.g., the client computer 102) is instructed to perform operations based upon the applied bucket. The method 300 then proceeds to operation 316. The method 300 ends at operation 316.

If, however, at operation 312, it is determined that the failure does match a failure tag, the method 300 proceeds to operation 318, wherein the client computer that reported the failure (e.g., the client computer 102) is instructed to perform operations based upon the applied failure tag. The method 300 then proceeds to operation 316, wherein the method 300 ends.

An exemplary workflow providing more particular details of a method for managing failure messages is provided below. This workflow is provided merely for further explanation of the operations performed for managing failures and is not intended to be limiting in any way.

Test Logs Failure.
1. OtsLogListener receives failure
2. OtsLogListener writes failure to disk
   a. Failure message contains custom xml defining a unique/random id for the failure
3. OtsLogListener runs OnFailure methods
   a. OnFailure methods perform additional logging
   b. OnFailure methods "attach" files to log
      i. Includes stack trace data
   c. OnFailure methods "attach" FailureInfo objects to log
      i. Includes stack trace data
      ii. OtsLogListener does not write this data to the log immediately
4. OtsLogListener clears the "detected failure"
5. OtsLogListener relogs the failure with extended failure information
   a. Message contains custom xml containing the same unique/random id specified during step 2
   b. New log entry type
   c. Entry has inner xml for failure info
6. OtsLogListener pauses the test In the above, the OtsLogListener is a software component configured to receive log data from the test and write the log data to a disk or some other storage medium. An OnFailure method is a portion of the test which executes when a failure occurs. OnFailure methods are typically used to collect information that may be relevant for investigating the failure.

Failure tagging web service parses failure—timeout executing OnFailure methods.
1. OAClient sends failure info logged during Test logs failure step 2 to failure tagging web service
2. Failure tagging web service expects string to be line from OTL
   a. Parses failure message from string
   b. Hands message to failure tagging/bucketing logic In the above, OAClient is the software component configured to execute the test. The OTL is the log file created by the OtsLogListener and written in a format that the automation system understands.

Failure tagging web service parses failure—no timeout executing OnFailure methods.
1. OAClient sends the data logged during Test logs a failure step 5 to failure tagging web service
2. Web service expects string to be an entry from OTL
   a. Parses failure message and extended failure info from string
   b. Hands message to failure tagging/bucketing logic Result processor parses failure—timeout executing OnFailure methods
1. Result processor opens OTL and parses data
2. Failure entry logged during Test logs failure step 2 detected
3. Result processor reports that the scenario failed
   a. Extended error information is missing The controller passes the result processor data to the result engine. The controller is an automation system component that sends tests to OAClient. The result engine passes the result processor data to the failure tagging web service, which in turn will be responsible for the bucketing workflow. The result processor is an automation system component that parses the log file generated by a test. The result engine is an automation system component that acts on results from tests. The failure tagging web service is an automation system component that processes failure from tests.

Result processor parses failure—no timeout during OnFailure methods
1. Result processor opens OTL and parses data
2. Failure entry logged during Test logs failure step 2 detected
3. Failure entry logged during Test logs failure step 5 detected
4. Result processor checks to see if the unique id's recorded in steps 2 and 3 match; if so, failure data found in step 3 replaces data found in step 2
5. Result processor reports that the scenario failed
    a. Includes extended error information User views failure—timeout executing OnFailure methods
1. User opens the log
2. Viewer shows first failure logged during Test logs failure step 2

In the above, the viewer is the OtsLogViewer, which is a software component configured to show the test output/log to the user. This is a tool used during an investigation and may be separate from the system executing the test.

User views failure—no timeout executing OnFailure methods
1. User opens the log
2. Viewer shows first failure logged during Test logs failure step 2
3. Viewer does not show entry logged during Test logs failure step 5 if unique ids match
4. Optional: Viewer has functionality designed to show user extended failure data logged during Test logs failure step 5. (e.g., user hovers over line logged during Test logs failure step 2 and sees a stack trace).

The above workflow may result in cases where extended data used for failure bucketing could not be collected. These results should not be placed in the pool of results where no stack trace data was available. Instead, these results should be placed in a separate pool where they will only be compared across other results that had timeouts during the OnFailure process.

Figure 4:
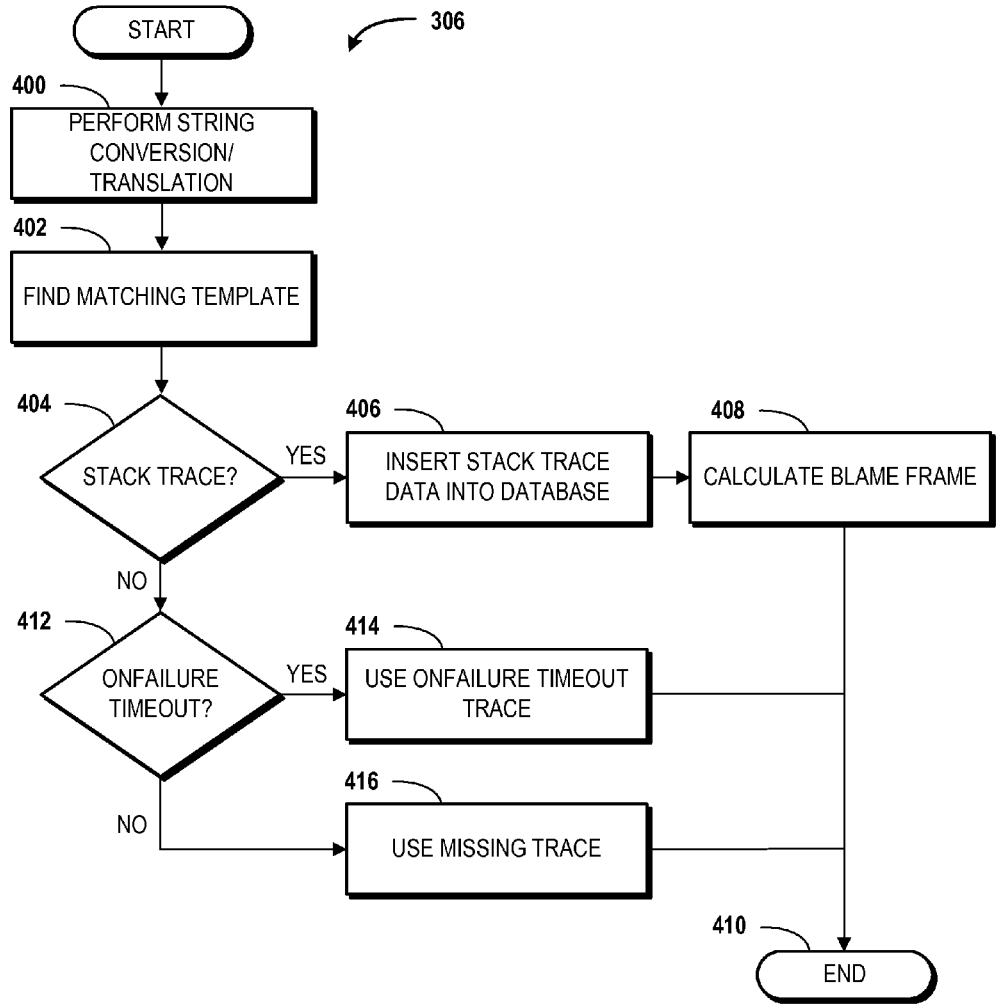
FIG. 4 is a flow diagram showing aspects of a method for pre-processing failure data, according to an exemplary embodiment.

Turning now to FIG. 4, the subprocess 306 for pre-processing failure data will be described. The subprocess 306 begins and proceeds to operation 400, wherein the failure message is converted and/or translated utilizing phrase substitution and/or pseudo translation. A pseudo translation is used herein to refer to a localization technique, which takes an English string and substitutes symbols that look like the English letters.

From operation 400, the method 300 proceeds to operation 402, wherein the failure message is compared to a matching failure template that is stored in the database 118. The subprocess 306 then proceeds to operation 404.

At operation 404, it is determined if the failure message has stack trace data. If it is determined that the failure message has stack trace data, at operation 404, the subprocess 306 proceeds to operation 406, wherein the stack trace data is inserted into the database 118. From operation 406 the subprocess 306 proceeds to operation 408, wherein a blame frame is calculated for the stack trace identified in the stack trace data. The subprocess 306 then proceeds to operation 410, wherein the subprocess 306 ends.

If it is determined that the failure message does not have stack trace data, at operation 404, the subprocess 306 proceeds to operation 412, wherein it is determined if an OnFailure timeout has occurred. If an OnFailure timeout has occurred, the subprocess 306 proceeds to operation 414, wherein the failure message is associated with a special "OnFailure timeout" trace. The subprocess 306 then proceeds to operation 410 and the subprocess 306 ends. If an OnFailure timeout has not occurred, the subprocess 306 proceeds to operation 416, wherein the failure message is associated with a special "no trace" trace. The subprocess 306 then proceeds to operation 410 and the subprocess 306 ends. The result of the subprocess 306 continues with operation 308, described above.

Figure 5:
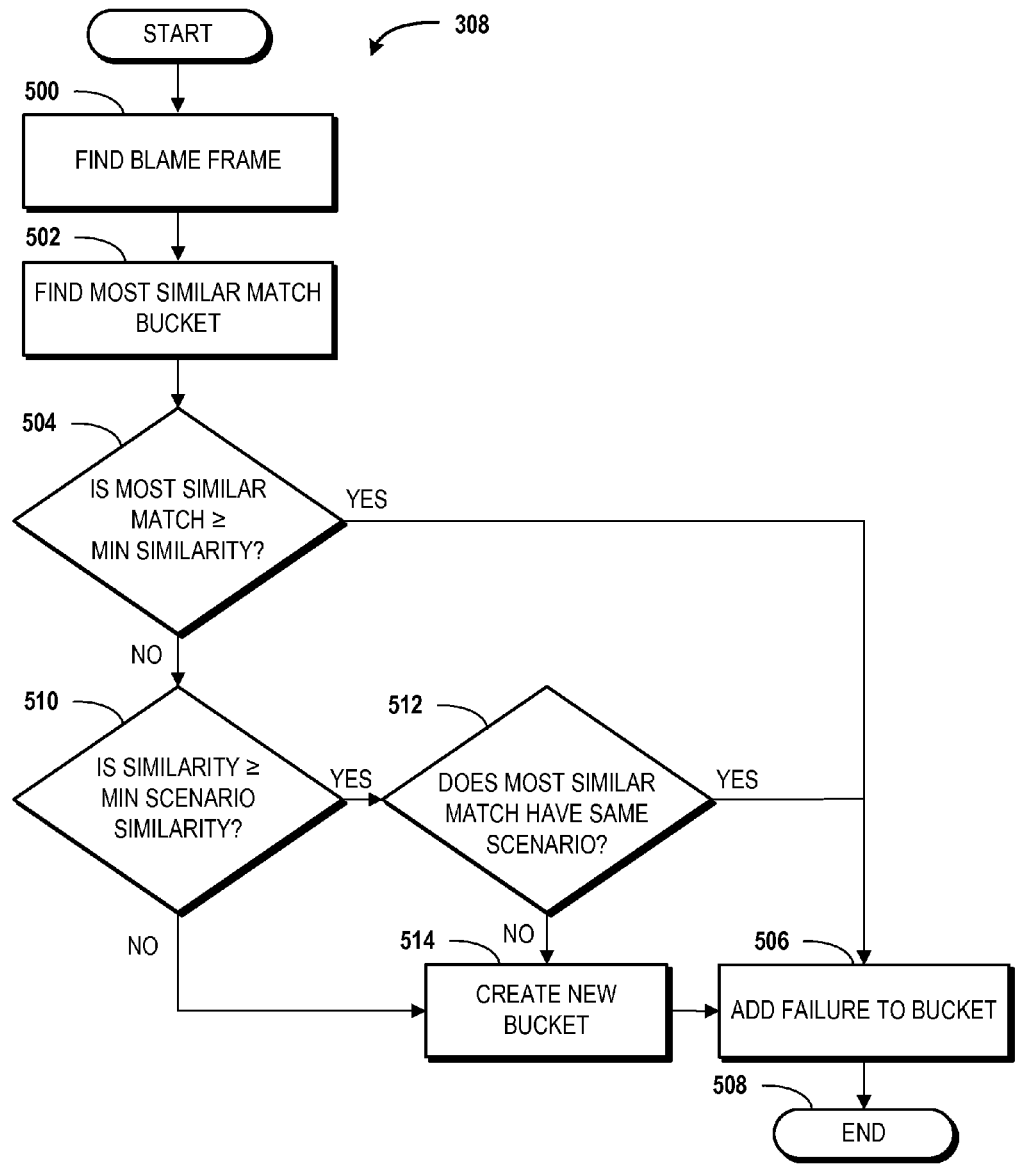
FIG. 5 is a flow diagram showing aspects of a method for bucketing failures, according to an exemplary embodiment.

Turning now to FIG. 5, the subprocess 312 for bucketing failure messages will be described. The subprocess 312 is also referred to herein, at times, as a bucketing method or a bucketing algorithm. The subprocess 312 begins and proceeds to operation 500, wherein the blame frame for the failure message is found. In some embodiments, a blame frame is found by searching a stack trace of the target application 110 for a blame frame from which the failure message originated. In some embodiments, searching includes searching a portion of a stack trace that does not include one or more predefined components. For example, a developer may determine that a particular portion of a stack trace does not typically include good candidates for blameable frames. As a result, the developer may choose to ignore that portion for stack trace searches associated with a particular application. It is contemplated that the failure bucketing application 116 may be configured with which portion(s) should be and/or which portions should not be searched in general or with regard to a particular target application. Examples of portions that a developer may not want to search are methods within a stack trace that are associated with a ThreadStart call or logging code. Those skilled in the art will appreciate other portions that may be ignored for search purposes.

In some embodiments, searching a stack trace for a blame frame includes comparing each stack trace frame on the stack trace to a record of exempt stack trace frames. In these embodiments, a blame frame is a particular stack trace frame of the stack trace frames within the stack trace that is not exempt as identified by the record of exempt frames.

After a blame frame is found at operation 500, the subprocess 312 proceeds to operation 502, wherein buckets that are associated with the blame frame are iterated over in an effort to determine which bucket of the buckets is most similar to the failure message and which bucket meets a specified minimum similarity requirement for that bucket. The bucket that meets both of these requirements is selected, at operation 502, as the most similar match bucket across buckets associated with the blame frame of the failure message. In some embodiments, all buckets are iterated over regardless of whether the blame frame is associated therewith.

From operation 502, the subprocess 312 proceeds to operation 504, wherein it is determined if the most similar match found in operation 502 is greater than or equal to a minimum similarity threshold. If it is determined, at operation 504, that the most similar match is greater than or equal to a minimum similarity threshold, the subprocess 312 proceeds to operation 506, wherein the failure message is added to (associated with) the most similar match bucket. The subprocess 312 then proceeds to operation 508, wherein the subprocess 312 ends. If it is determined, at operation 504, that the most similar match is less than a minimum similarity threshold, the subprocess 312 proceeds to operation 510.

At operation 510, it is determined if the similarity is greater than or equal to a minimum scenario similarity. If it is determined, at operation 510, that the similarity is greater than or equal to a minimum scenario similarity, the subprocess 312 proceeds to operation 512, wherein it is determined if the most similar match has the same scenario. If it is determined, at operation 512, that the most similar match has the same scenario, the subprocess 312 proceeds to operation 506, wherein the failure message is added to (associated with) the most similar match bucket. The subprocess 312 then proceeds to operation 508, wherein the subprocess 312 ends. If it is determined, at operation 512, that the most similar match does not have the same scenario, the subprocess 312 proceeds to operation 514, wherein a new bucket is created. The subprocess 312 then proceeds to operation 506, wherein failure message is added to (associated with) the new bucket. The subprocess 312 then ends at operation 508.

If it is determined, at operation 510, that the similarity is less than a minimum scenario similarity, the subprocess 312 proceeds to operation 514, wherein a new bucket is created. The subprocess 312 then proceeds to operation 506, wherein failure message is added to (associated with) the new bucket. The subprocess 312 then ends at operation 508.

Figure 6:
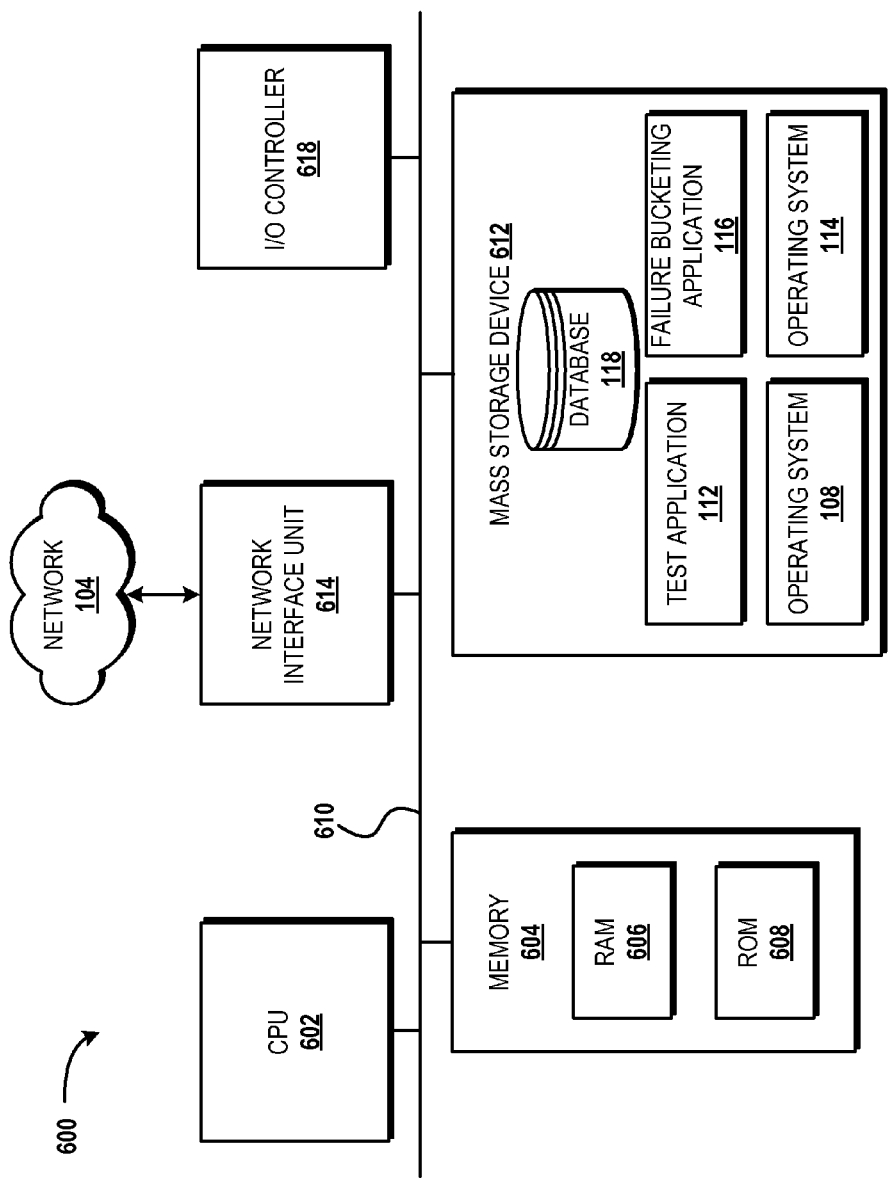
FIG. 6 is a computer architecture diagram illustrating an exemplary computer hardware and software architecture for a computing system capable of implementing aspects of the embodiments presented herein.

FIG. 6 illustrates an exemplary computer architecture 600 for a device capable of executing the software components described herein for test failure bucketing. Thus, the computer architecture 600 illustrated in FIG. 6 illustrates an architecture for a server computer, mobile phone, a PDA, a smart phone, a desktop computer, a netbook computer, a tablet computer, and/or a laptop computer. The computer architecture 600 may be utilized to execute any aspects of the software components presented herein with respect to any of the computer systems described herein, such as the client computer 102 and the server computer 104.

The computer architecture 600 illustrated in FIG. 6 includes a central processing unit 602 ("CPU"), a system memory 604, including a random access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing, where appropriate, the operating systems 108, 114, the target application 110 the test application 112, the failure bucketing application 116, and the database 118.

The mass storage device 612 is connected to the CPU 602 through a mass storage controller (not shown) connected to the system bus 610. The mass storage device 612 and its associated computer-readable media provide non-volatile storage for the computer architecture 600. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, the phrase "computer storage medium" and variations thereof, does not include waves, signals, and/or other transitory and/or intangible communication media, per se.

According to various embodiments, the computer architecture 600 may operate in a networked environment using logical connections to remote computers through a network 104. The computer architecture 600 may connect to the network 104 through a network interface unit 614 connected to the bus 610. It should be appreciated that the network interface unit 614 also may be utilized to connect to other types of networks and remote computer systems. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Based on the foregoing, it should be appreciated that concepts and technologies for test failure bucketing have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A computer-implemented method for bucketing failure messages generated as a result of a test performed on a target application, the computer-implemented method comprising computer-implemented operations for:
    receiving a failure message that is associated with a failure;
    in response to receiving the failure message, searching a stack trace of a test application for a blame stack trace frame from which the failure message originated;
    if the blame stack trace frame is found, finding a most similar match bucket from a plurality of buckets, each of the plurality of buckets being associated with the blame stack trace frame;
    if the blame stack trace frame is not found, finding the most similar match bucket from the plurality of buckets, the plurality of buckets comprising a set of buckets each comprising failures and associated failure data that do not have an associated blame stack trace frame;
    determining if the most similar match bucket at least meets a similarity threshold;
    if it is determined that the most similar match bucket at least meets the similarity threshold, adding the failure message and associated failure data to the most similar match bucket; and
    if it is determined that the most similar match bucket does not at least meet the similarity threshold, creating a new bucket and adding the failure message and the associated failure data to the new bucket.

2. The computer-implemented method of claim 1, wherein searching the stack trace of the test application for the blame stack trace frame from which the failure message originated comprises searching a portion of the stack trace that does not include one or more predefined components.

3. The computer-implemented method of claim 1, wherein searching the stack trace of the test application for the blame stack trace frame from which the failure message originated comprises comparing each stack trace frame on the stack trace to a record of exempt frames, the blame stack trace frame being a particular stack trace frame of the stack trace frames on the stack trace that is not exempt as identified by the record of exempt frames.

4. The computer-implemented method of claim 1, wherein determining if the most similar match bucket at least meets the similarity threshold comprises determining if the most similar match bucket is greater than or equal to a pre-defined percentage similarity.

5. The computer-implemented method of claim 4, wherein the pre-defined percentage similarity used if the blame stack trace frame is found is different than the pre-defined similarity used if the blame stack trace frame is not found.

6. The computer-implemented method of claim 1, further comprising, if it is determined that the most similar match bucket does not at least meet the similarity threshold, and prior to creating the new bucket:
    determining if a similarity of the most similar match bucket is greater than or equal to a minimum scenario similarity;
    if the similarity of the most similar match bucket is not greater than or equal to the minimum scenario similarity, creating the new bucket and adding the failure message and the associated failure data to the new bucket;
    if the similarity of the most similar match bucket is greater than or equal to the minimum scenario similarity, determining if the most similar match bucket has a same scenario;
    if the most similar match bucket has the same scenario, adding the failure message and the associated failure data to the most similar match bucket; and
    if the most similar match bucket does not have the same scenario, creating the new bucket and adding the failure message and the associated failure data to the new bucket.

7. A computer storage medium having computer readable instructions stored thereupon that, when executed by a computer, cause the computer to:
    receive a failure message that is associated with a failure;
    in response to receiving the failure message, search a stack trace of a test application for a blame stack trace frame from which the failure message originated;
    if the blame stack trace frame is found, find a most similar match bucket from a plurality of buckets, each of the plurality of buckets being associated with the blame stack trace frame;
    if the blame stack trace frame is not found, find the most similar match bucket from the plurality of buckets, the plurality of buckets comprising a set of buckets each comprising failures and associated failure data that do not have an associated blame stack trace frame;
    determine if the most similar match bucket at least meets a similarity threshold;
    if it is determined that the most similar match bucket at least meets the similarity threshold, add the failure message and associated failure data to the most similar match bucket; and
    if it is determined that the most similar match bucket does not at least meet the similarity threshold, create a new bucket and adding the failure message and the associated failure data to the new bucket.

8. The computer storage medium of claim 7, wherein the instructions to search the stack trace of the test application for the blame stack trace frame from which the failure message originated comprise instructions to search a portion of the stack trace that does not include one or more predefined components.

9. The computer storage medium of claim 7, wherein the instructions to search the stack trace of the test application for the blame stack trace frame from which the failure message originated comprise instructions to compare each stack trace frame on the stack trace to a record of exempt frames, the blame stack trace frame being a particular stack trace frame of the stack trace frames on the stack trace that is not exempt as identified by the record of exempt frames.

10. The computer storage medium of claim 7, wherein the instructions to determine if the most similar match bucket at least meets the similarity threshold comprise instructions to determine if the most similar match bucket is greater than or equal to a pre-defined percentage similarity.

11. The computer storage medium of claim 10, wherein the pre-defined percentage similarity used if the blame stack trace frame is found is different than the pre-defined similarity used if the blame stack trace frame is not found.

12. The computer storage medium of claim 7, further having instructions stored thereupon that, when executed by the computer, cause the computer to, if it is determined that the most similar match bucket does not at least meet the similarity threshold, and prior to creating the new bucket:
 determine if a similarity of the most similar match bucket is greater than or equal to a minimum scenario similarity;
 if the similarity of the most similar match bucket is not greater than or equal to the minimum scenario similarity, create the new bucket and add the failure message and the associated failure data to the new bucket;
 if the similarity of the most similar match bucket is greater than or equal to the minimum scenario similarity, determine if the most similar match bucket has a same scenario;
 if the most similar match bucket has the same scenario, add the failure message and the associated failure data to the most similar match bucket; and
 if the most similar match bucket does not have the same scenario, create the new bucket and add the failure message and the associated failure data to the new bucket.

13. A computer-implemented method for managing failure messages, the computer-implemented method comprising computer-implemented operations for:
 receiving a failure message comprising a text string;
 logging the failure message;
 pre-processing failure data associated with the failure message by
  finding a matching template for the failure message,
  determining if the failure message has stack trace data associated therewith,
  if the failure message has stack trace data associated therewith,
   inserting the trace data into a database and
   calculating a blame stack trace frame for a stack trace identified in the stack trace data, and
  if the failure message does not have the stack trace data associated therewith,
   inserting dummy stack trace data into the database, and
   using a dummy stack trace frame as the blame stack trace frame;
 bucketing the failure message and the failure data into a bucket;
 performing failure tagging for the failure message;
 determining if the failure message matches a failure tag identified via the failure tagging;
 if the failure message matches the failure tag, applying the failure tag to the failure message and instructing a reporting client computer to perform operations based upon the applied failure tag; and
 if the failure message does not match the failure tag, instructing the reporting client computer to perform operations based upon the bucket to which the failure message was applied.

14. The computer-implemented method of claim 13, wherein bucketing the failure message comprises:
 finding a most similar match bucket from a plurality of buckets;
 determining if the most similar match bucket at least meets a similarity threshold;
 if it is determined that the most similar match bucket at least meets the similarity threshold, adding the failure message to the most similar match bucket; and
 if it is determined that the most similar match bucket does not at least meet the similarity threshold, creating a new bucket and adding the failure message to the new bucket.

15. The computer-implemented method of claim 14, wherein finding a most similar match bucket from a plurality of buckets is dependent upon whether the blame stack trace frame is calculated or the blame stack trace frame is the dummy stack trace frame, and wherein:
 if the blame stack trace frame is calculated, finding the most similar match bucket from the plurality of buckets comprises finding the most similar match bucket from the plurality of buckets, each of the plurality of buckets being associated with the blame stack trace frame; and
 if the blame stack trace frame is the dummy stack trace frame, finding the most similar match bucket from the plurality of buckets, the plurality of buckets comprising a set of buckets each matching the dummy stack trace frame.

16. The computer-implemented method of claim 15, wherein determining if the most similar match bucket at least meets the similarity threshold comprises determining if the most similar match bucket is greater than or equal to a pre-defined percentage similarity.

17. The computer-implemented method of claim 13 further comprising, if it is determined that the most similar match bucket does not at least meet the similarity threshold, and prior to creating the new bucket:
 determining if a similarity of the most similar match bucket is greater than or equal to a minimum scenario similarity;
 if the similarity of the most similar match bucket is not greater than or equal to the minimum scenario similarity, creating the new bucket and adding the failure message and the associated failure data to the new bucket;
 if the similarity of the most similar match bucket is greater than or equal to the minimum scenario similarity, determining if the most similar match bucket has a same scenario;
 if the most similar match bucket has the same scenario, adding the failure message and the associated failure data to the most similar match bucket; and
 if the most similar match bucket does not have the same scenario, creating the new bucket and adding the failure message and the associated failure data to the new bucket.

* * * * *